United States Patent [19]
Honda et al.

[11] Patent Number: 5,452,587
[45] Date of Patent: Sep. 26, 1995

[54] AIR-CONDITIONING DEVICE

[75] Inventors: Yuji Honda; Tomotsugu Terada, both of Okazaki; Katsuhiko Samukawa, Oobu, all of Japan

[73] Assignee: Nippondenso Co., Ltd., Kariya, Japan

[21] Appl. No.: 275,729

[22] Filed: Jul. 19, 1994

[30] Foreign Application Priority Data

Jul. 20, 1993 [JP] Japan ................................. 5-178904

[51] Int. Cl.$^6$ .................................. F24F 3/00; F24F 7/00
[52] U.S. Cl. ........................... 62/244; 236/49.3; 165/16
[58] Field of Search ............................ 236/49.3; 62/244; 165/16, 22, 28

[56] References Cited

U.S. PATENT DOCUMENTS

| | | | |
|---|---|---|---|
| 4,477,018 | 10/1984 | Rathgeber | 236/1 B |
| 4,482,009 | 11/1984 | Nishimura et al. | 62/244 X |
| 4,586,652 | 5/1986 | Sakurai | 62/244 X |
| 4,658,888 | 4/1987 | Sakurai et al. | 165/22 |
| 4,665,971 | 5/1987 | Sakurai | 165/22 |
| 4,711,295 | 12/1987 | Sakurai | 62/244 X |
| 4,800,051 | 1/1989 | Sakurai | 62/244 X |
| 5,209,397 | 5/1993 | Arold et al. | 236/49.3 |
| 5,337,802 | 8/1994 | Kajino et al. | 165/22 |

FOREIGN PATENT DOCUMENTS

83048 3/1986 European Pat. Off. .

*Primary Examiner*—William E. Tapolcai
*Attorney, Agent, or Firm*—Cushman, Darby & Cushman

[57] ABSTRACT

Temperatures in a first air-conditioning zone and in a second air-conditioning zone are controlled highly independently of each other irrespective of a difference between the setpoint temperatures in these air-conditioning zones or the state of the external air temperature. An ECU 23 calculates target blow-out temperatures in an air-conditioning system 7 on the driver's seat side and in an air-conditioning system 8 on the driver's seat side based upon temperatures Tset(Dr) and Tset(Pa) set by temperature setters 25 and 26, a difference between the setpoint temperatures Tset(Dr) and Tset(Pa), an internal air temperature Tr, an external air temperature Tam, and the amount of solar radiation Ts, and controls, based on the calculated result, the opening degrees of the air-mixing dampers 9, 10 (temperatures of the blown-out airs), blow-out port modes in the air-conditioning systems 7 and 8, and the air blow rate of the blower 3. The ECU 23 corrects the calculation term corresponding to the difference between the setpoint temperatures Tset(Dr) and Tset(Pa) in the air-conditioning zones on the driver's seat side and on the side of the seat next to the driver depending upon the data of external air temperature Tam detected by an external air temperature sensor at the time of calculating the target blow-out temperatures.

5 Claims, 10 Drawing Sheets

AIR-CONDITIONING DEVICE

BACKGROUND OF THE INVENTION

1. Field of the Invention

The present invention relates to an air-conditioning device for controlling the temperatures that are set in a room such as, for example, a passenger compartment in a first air-conditioning zone and in a second air-conditioning zone independently of each other.

2. Description of the Related Art

An air-conditioning device for controlling two or more different air-conditioning zones independently of each other has heretofore been known as represented by an air-conditioning device for automobiles disclosed in, for example, Japanese Unexamined Patent Publication (Kokai) No. 58-33509. In practice, automobiles employ an air-conditioning unit of a structure shown in FIG. 3 when the temperatures in the air-conditioning zone on the the driver's seat side and in the air-conditioning zone on the side of the seat next to the driver in the passenger compartment are to be controlled independently of each other.

Figure 3:
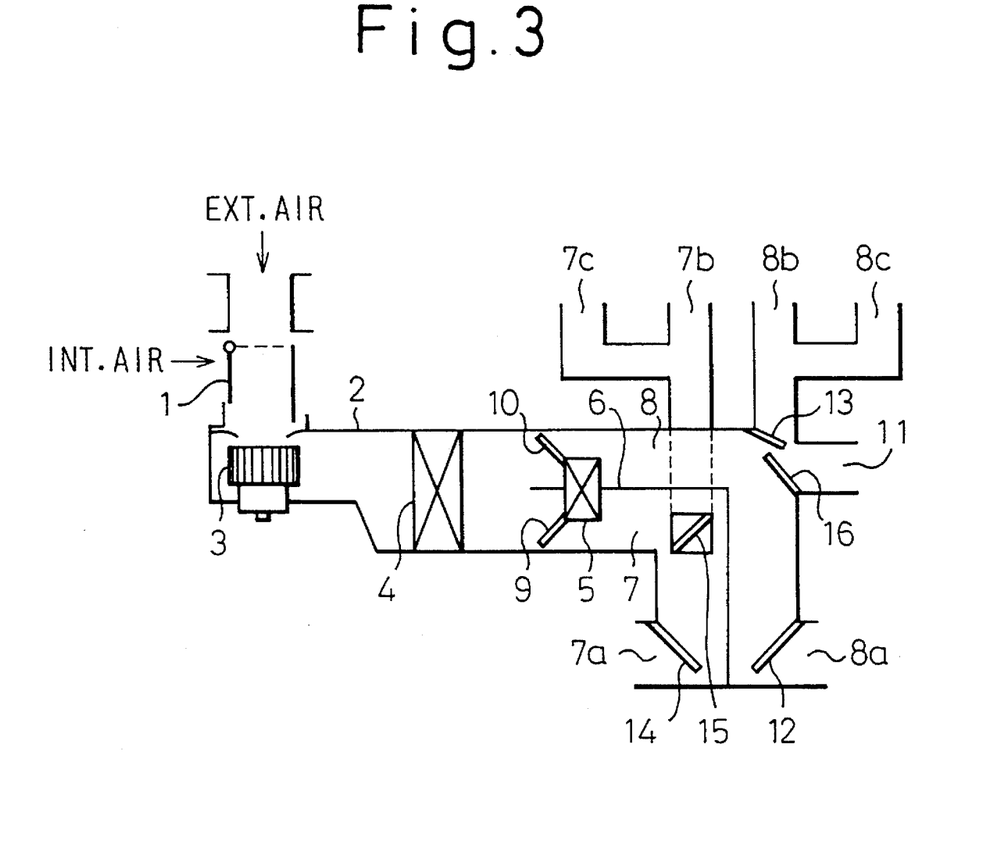
FIG. 3 is a diagram illustrating the constitution of a conventional air-conditioning unit.

That is, in FIG. 3, there are arranged a blower 3, an evaporator 4 and a heater core from the upstream side toward the downstream side in an air duct 2 that is equipped with an internal air/external air change-over damper 1 on the most upstream side, and the downstream side of the heater core 5 is divided by a partitioning wall 6 into an air-conditioning system 7 on the driver's seat side and an air-conditioning system 8 on the side of the seat, next to the driver.

On the upstream side of the heater core 5, there is provided an air-mixing damper 9 on the driver's seat side for adjusting the ratio of the amount of the air that flows into the air-conditioning system 7 on the driver's seat side passing through the heater core 5 and the amount of the air that flows into the air-conditioning system 7 by-passing the heater core 5. There is further provided an air-mixing damper 10 on the side of the seat next to the driver for adjusting the ratio of the amount of the air that flows into the air-conditioning system 8 on the side of the seat next to the driver passing through the heater core 5 and the amount of the air that flows into the air-conditioning system 8 by-passing the heater core 5.

On the most downstream sides of the air-conditioning system 7 of the driver's seat side and of the air-conditioning system 8 of the side of the seat next to the driver, there are provided foot blow-out ports 7a and 8a for blowing the conditioned air onto the feet of the passengers, face blow-out ports 7b, 7c and 8b, 8c on the center side for blowing the conditioned air to the faces and chests of the passengers, and a defroster blow-out port 11 for blowing out the conditioned air onto the front window pane. In the air-conditioning system 7 on the driver's seat side and in the air-conditioning system 8 on the side of the seat next to the driver are provided blow-out port change-over dampers 12 to 16 for selectively opening and closing the above blow-out ports 7aa to 7c, 8a to 8c and 11. By changing the opening degrees of these dampers 12 to 16, it is possible to obtain a predetermined blow-out port mode such as a foot mode, a bi-level mode, a fase mode or a defrost mode independently between the air-conditioning system 7 and the air-conditioning system 8.

Separate temperature setters are used to input a setpoint temperature Tset(Dr) for the air-conditioning zone on the driver's seat side that corresponds to the foot blow-out port 7a and the face blow-out ports 7b, 7c in the air-conditioning system 7 on the driver's seat side and to input a setpoint temperature Tset(Pa) for the air-conditioning zone on the side of the seat next to the driver that corresponds to the foot blow-out port 8a and face blow-out ports 8b, 8c in the air-conditioning system 8 on the side of the seat next to the driver. Here, however, the setpoint temperatures Tset(Dr) and Tset(Pa) must be determined by taking the temperatures inside and outside the passenger compartment of an automobile and the amount of solar radiation into consideration. In practice, furthermore, there exist air stream interference and temperature interference between the two air-conditioning zones, and the air blown into one air-conditioning zone and its temperature affect the temperature in the other air-conditioning zone. Therefore, a difference between the setpoint temperatures Tset(Dr) and Tset(Pa) must also be taken into consideration.

It can therefore be contrived to determine a target blow-out temperature TAO(Dr) on the driver's seat side and a target blow-out temperature TAO(Pa) on the side of the seat next to the driver through a calculation in compliance with the following equations (1) and (2), and to determine the opening degrees of the air-mixing dampers 9 and 10 of the driver's seat side and of the seat next to the driver side relying thereupon, as well as to determine the blow-out port modes of the air-conditioning systems 7 and 8 and the control voltage for the blower 3.

$$TAO(Dr)=K_{set} \cdot T_{set}(Dr)-Kr \cdot Tr-K_{am} \cdot T_{am} -Ks \cdot Ts+Kd(Dr)\,(T_{set}(Dr))-T_{set}(Pa))+C \qquad (1)$$

$$TAO(Pa)=K_{set} \cdot T_{set}(Pa)-Kr \cdot Tr-K_{am} \cdot T_{am} -Ks \cdot Ts+Kd(Pa)\,(T_{set}(Pa)-T_{set}(Dr))+C \qquad (2)$$

where Tr, Tam and Ts are an internal air temperature (temperature in the passenger compartment of an automobile), an external air temperature (temperature outside the passenger compartment of an automobile) and the amount of solar radiation entering into the passenger compartment of an automobile, Kset, Kr, Kam, Ks, Kd(Dr) and Kd(Pa) denote a temperature setpoint gain, an internal air temperature gain, an external air temperature gain, a solar radiation amount gain, and temperature difference correction gain between the air-conditioning zone on the driver's seat side and the air-conditioning zone on the side of the seat next to the driver, and C denotes a correction constant.

The opening degree SW(Dr)(%) of the air-mixing damper 9 on the driver's seat side and the opening degree SW(Pa)(%) of the air-mixing damper 10 on the side of the seat next to the driver are determined through calculations in compliance with the following equations (3) and (4).

$$SW(Dr)=(TAO(Dr)-TE)\times 100/(TW-TE) \qquad (3)$$

$$SW(Pa)=(TAO(Pa)-TE)\times 100/(TW-TE) \qquad (4)$$

where TW is a temperature of the engine cooling water that flows through the heater core 5, and TE is a temperature of the air after it has exchanged the heat with the evaporator 4.

Figure 4:
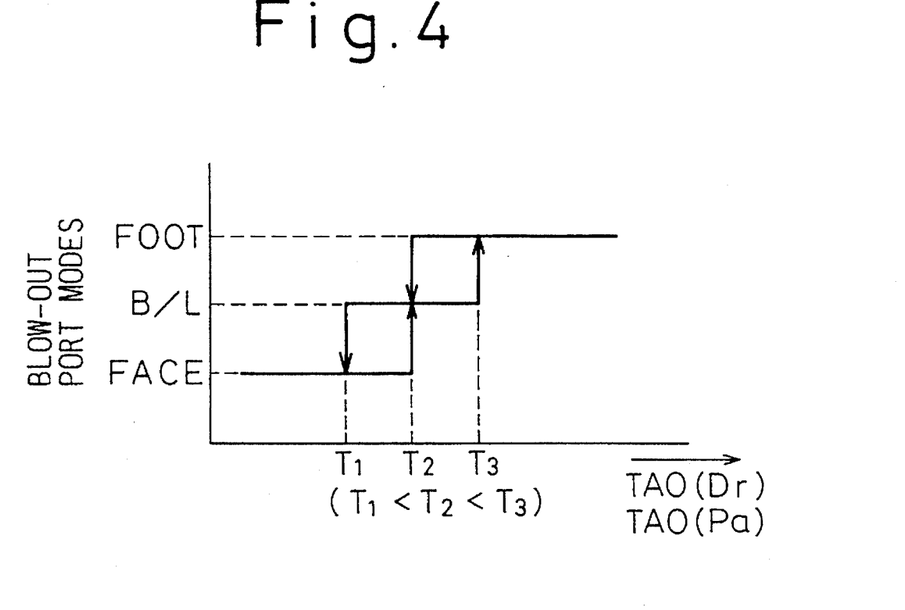
FIG. 4.is a diagram of characteristics illustrating a relationship between the target blow-out temperature and the blow-out port mode.

The blow-out port modes of the air-conditioning systems 7 and 8 of the driver's seat side and of the seat next to the driver side are determined based upon the target blow-out temperatures TAO(Dr) and TAO(Pa), and upon predetermined target blow-out temperature vs. blow-out port mode characteristics shown in FIG. 4. That is, when the target blow-out temperatures TAO(Dr) and TAO(Pa) are relatively high, the foot mode (FOOT) is selected and when the target blow-out temperatures TAO(Dr) and TAO(Pa) are relatively low, the face mode (FACE) is selected. Furthermore, when the target blow-out temperatures TAO(Dr) and TAO(Pa) are between the above-mentioned states, the bi-level mode (B/L) is selected. Here, as will be obvious from FIG. 4, a predetermined differential is maintained between the target blow-out temperatures TAO(Dr), TAO(Pa) and the blow-out port modes.

Figure 5:
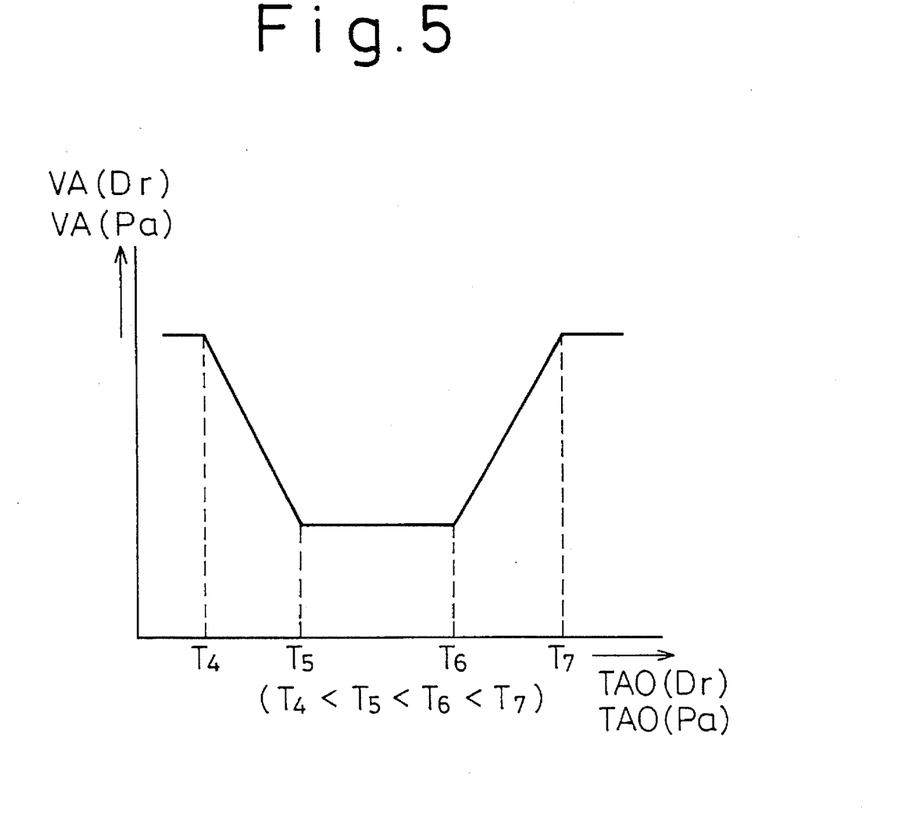
FIG. 5 is a diagram of characteristics illustrating a relationship between the target blow-out temperature and the blower control voltage.

Moreover, the control voltage VA for the blower 3 for determining the air blow rate is obtained by finding a control voltage VA(Dr) suited for the target blow-out temperature TAO(Dr) on the driver's seat side and a control voltage VA(Pa) suited for the target blow-out temperature TAO(Pa) on the side of the seat next to the driver based upon a relationship of FIG. 5, and then averaging these control voltages VA(Dr) and VA(Pa).

Figure 6:
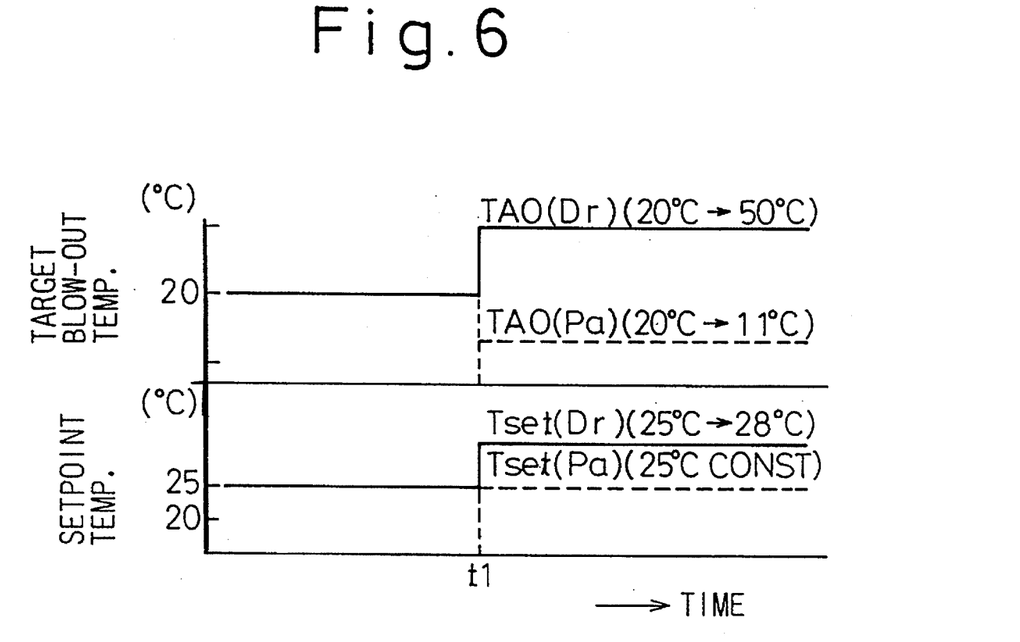
FIG. 6 is a diagram of characteristics illustrating a relationship between the setpoint temperature and the target blow-out temperature.

It is now presumed that the target blow-out temperatures TAO(Dr) and TAO(Pa) are 20° C. in the case where the setpoint temperatures Tset(Dr) and Tset(Pa) are 25° C., in a given environmental condition as shown in FIG. 6 which illustrates a change in the target blow-out temperature in response to a setpoint temperature. In this case, if the setpoint temperature Tset(Dr) on the driver's seat side is changed from 25° C. into 28° C. at a timing t1 with the setpoint temperature Tset(Pa) on the side of the seat next to the driver being maintained at 25° C., the target blow-out temperature TAO(Dr) on the driver's seat side changes from 20° C. into, for example, 50° C., and the target blow-out temperature TAO(Pa) on the side of the seat next to the driver changes from 20° C. into, for example, 11° C. This change in the target blow-out temperature TAO(Pa) stems from the presence of a calculation term "Kd(Pa)(Tset(Pa)−Tset(Dr))" for correcting the temperature difference between the air-conditioning zone on the driver's seat side and the air-conditioning zone on the side of the seat next to the driver in the aforementioned equation (2).

However, even though the temperature difference between the right air-conditioning zone and the left air-conditioning zone has been controlled in the prior art, the effect of temperature of the external air upon the temperature of the conditioned air had not at all been taken into consideration causing a problem that is described below.

Figure 7:
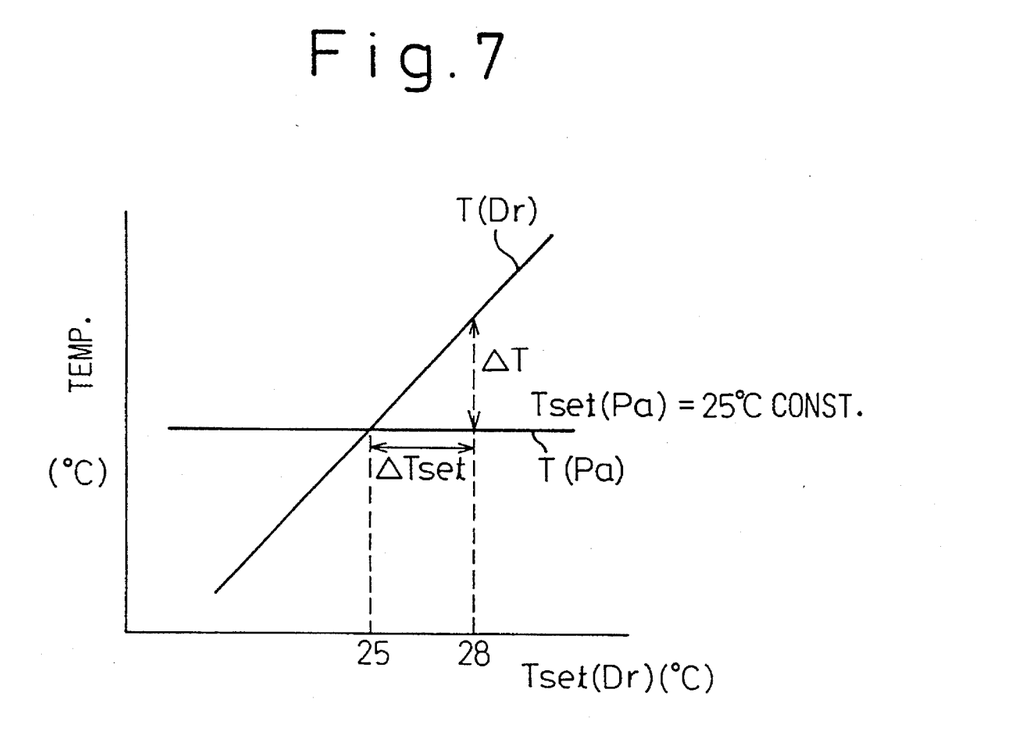
FIG. 7 is a diagram illustrating the air-conditioning temperature characteristics in the air-conditioning zones when the temperature in one air-conditioning zone is set constant and the temperature in the other air-conditioning zone is varied.
Figure 8:
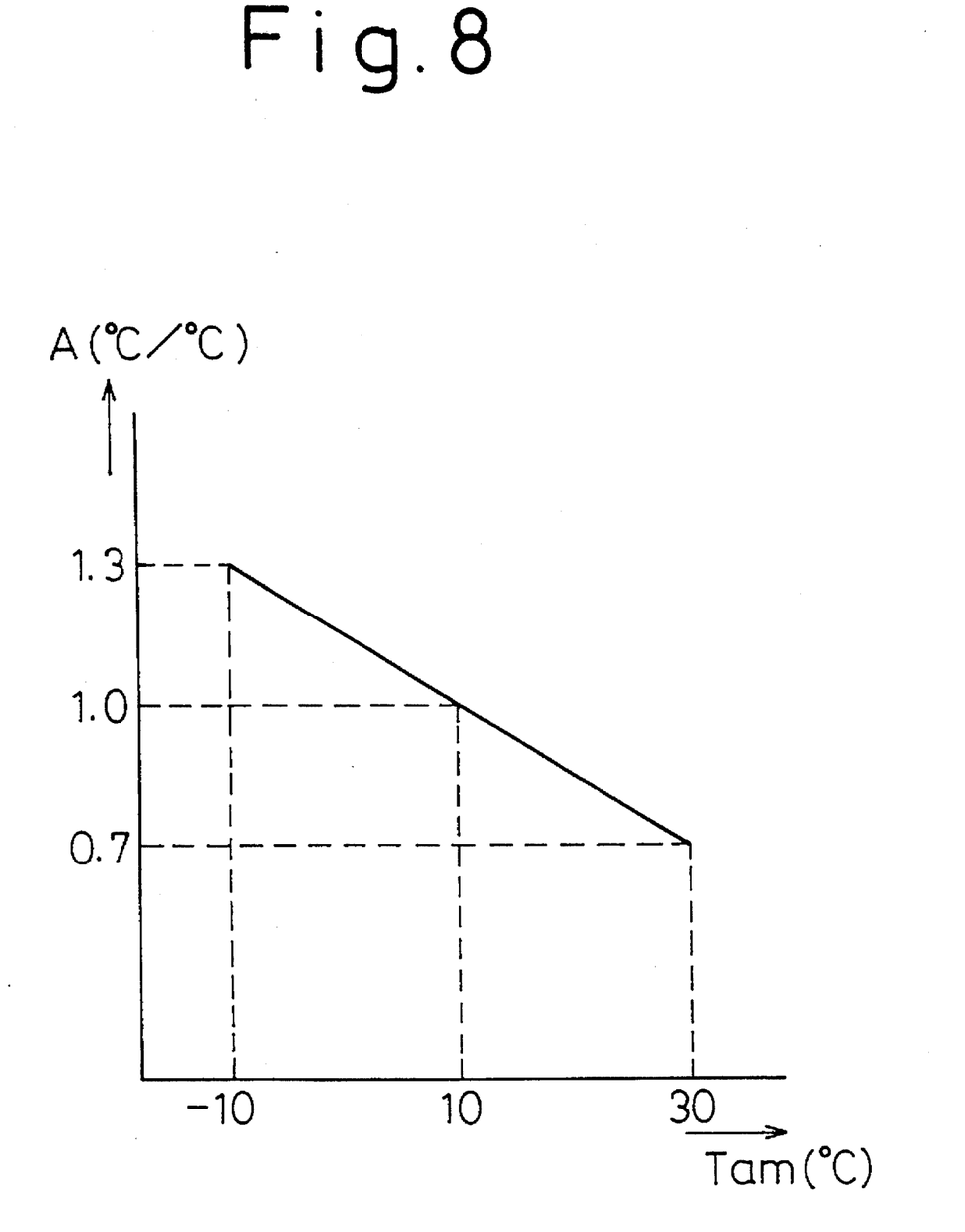
FIG. 8 is a diagram of characteristics illustrating a relationship between the external air temperature and a ratio of difference in an average air-conditioning temperature in the air-conditioning zones with respect to a change in the setpoint temperatures in the air-conditioning zones.

That is, it was clarified that a relationship between the external air temperature Tam and the control temperature ratio A becomes as shown in FIG. 8 in a state in which the setpoint temperature Tset(Pa) on the side of the seat next to the driver is maintained at 25° C. constant as shown in FIG. 7, wherein ΔT denotes an average difference between the air-conditioning temperatures T(Dr) and T(Pa) when the setpoint temperature Tset(Dr) on the driver's seat side is changed, and the ratio (ΔT/ΔTset) of the above temperature difference ΔT with respect to a change ΔTset in the setpoint temperatures Tset(Dr) and Tset(Pa) is called control temperature ratio A.

In an example of FIG. 8, the temperature control ratio A becomes "1" when the external air temperature Tam is 10° C. and the air-conditioning temperature is not affected by the external air temperature Tam. When the external air temperature Tam is 30° C., however, the control temperature ratio A drops. Therefore, when a state where the external air temperature is 10° C. is compared with a state where the external air temperature is 30° C., the practical temperature difference ΔT between the air-conditioning zones decreases in the state where the external air temperature is 30° C. In a state where the external air temperature Tam is −10° C., the practical temperature difference ΔT between the air-conditioning zones increases contrary to the above-mentioned case.

In short, when different temperatures Tset(Dr) and Tset(Pa) are set in the air-conditioning zones on the driver's seat side and on the side of the seat next to the driver, the practical difference in the air-conditioning temperature between the air-conditioning zones becomes smaller than a preset value in a state where the external air temperature is relatively high like in summer and the practical difference in the air-conditioned temperature between the air-conditioning zones become larger than a preset value in a state where the external air temperature is relatively low like in winter, causing the independence of the air-conditioning zones to be lost.

SUMMARY OF THE INVENTION

The present invention was accomplished in view of the above-mentioned circumstances, and its object is to provide an air-conditioning device for controlling the air-conditioning temperatures in a first air-conditioning zone and in a second air-conditioning zone highly independently of each other irrespective of a difference in the setpoint temperatures between the air-conditioning zones or the temperature of the external air.

In order to accomplish the above-mentioned object, the present invention provides an air-conditioning device in which a first air-conditioning zone and a second air-conditioning zone are set in a passenger compartment, and the temperatures in these air-conditioning zones are separately adjusted by the conditioned air blown from the blow-out ports provided for these air-conditioning zones, comprising first and second temperature-setting means for separately setting the temperatures in the first and second air-conditioning zones, a temperature data-detecting means for detecting the temperature inside the passenger compartment and the temperature outside the passenger compartment, a calculation means for calculating first and second target blow-out temperatures for the air-conditioning zones based upon the setpoint temperatures set by the first and second temperature-setting means for the first and second air-conditioning zones, a difference between the setpoint temperatures, and temperature data detected by the temperature data-detecting means, and a temperature-adjusting means for so adjusting the temperatures of the conditioned air from the blow-out ports corresponding to the first and second air-conditioning zones that the first and second target blow-out temperatures calculated by the calculation means are realized wherein the calculation means has a function for adding a correction which varies depending upon the temperature data on the outside of the passenger compartment detected by the temperature data-detecting means to a calculation term that utilizes the difference between the setpoint temperatures in the first and second air-conditioning zones at the time of calculating the first and second target blow-out temperatures.

According to the above-mentioned means, when the air-conditioning temperature in the first air-conditioning zone and the air-conditioning temperature in the second air-conditioning zone in the passenger compartment of an automobile are separately set by using the first and second temperature-setting means, the calculation means calculates the first and second target blow-out temperatures for the air-conditioning zones based upon the setpoint temperatures in the air-conditioning zones, temperatures inside and outside the passenger compartment of an automobile, difference between the setpoint temperatures, and temperature data inside and outside the passenger compartment detected by the temperature data-detecting means. The temperature-adjusting means so adjusts the temperatures of the conditioned air from the blow-out ports of the first and second air-conditioning zones that the first and second target blow-out temperatures calculated above are accomplished. Thus, the air-conditioning temperatures in the air-conditioning zones are controlled so that the setpoint temperatures are realized.

At the time of calculating the first and second target blow-out temperatures, furthermore, the calculation means adds a correction that varies depending upon the temperature data on the outside of the passenger compartment detected by the temperature data-detecting means to a calculation term that corresponds to a difference between the setpoint temperatures in the air-conditioning zones. This correction makes it possible to offset the effect caused by the external air temperature that becomes a problem when different temperatures are set in the first and second air-conditioning zones, i.e., makes it possible to prevent such an inconvenience that a difference between the practical air-conditioning temperatures in the air-conditioning zones deviates from a predetermined value when the external air temperature is relatively high or relatively low. Thus, the correction makes it possible to heighten the independence of the air-conditioning zones.

DETAILED DESCRIPTION OF THE PREFERRED EMBODIMENT

An embodiment of the present invention will now be described with reference to FIGS. 1 and 2. Here, FIG. 1 contains the same constituent portions as those of FIG. 3 mentioned above. Therefore, such portions are denoted by the same reference numerals and their description is not repeated here.

Figure 1:
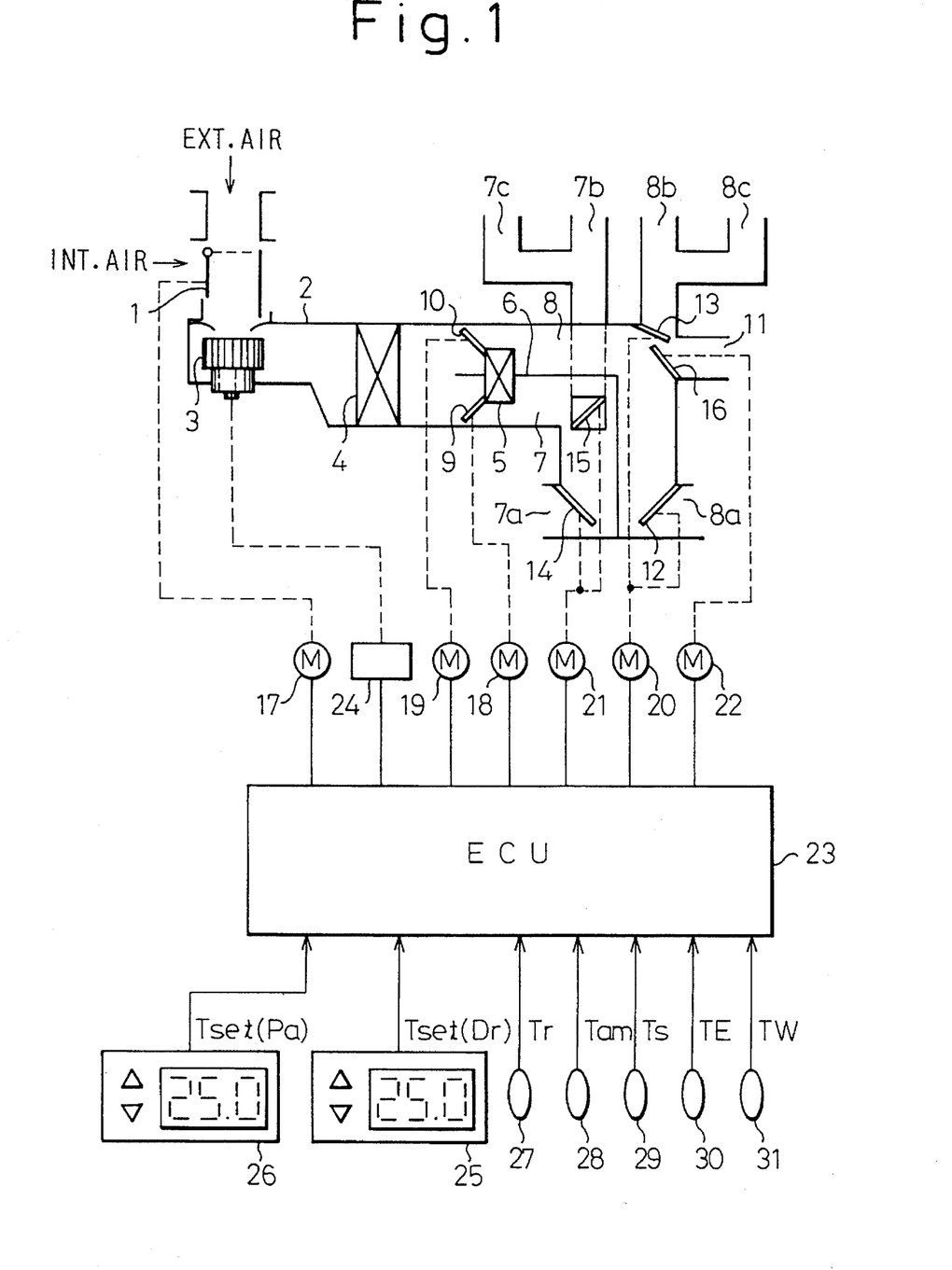
FIG. 1 is a diagram which concretely illustrates the constitution of an air-conditioning unit and a control system according to an embodiment of the present invention.

FIG. 1 concretely illustrates an air-conditioning unit similar to the one shown in FIG. 3 and a control system thereof.

In FIG. 1, the internal air/external air change-over damper 1 is driven by a servo motor 17, and the air-mixing damper 9 on the driver's seat side and the air-mixing damper 10 on the side of the seat next to the driver corresponding to the temperature-adjusting means of the present invention are driven by a servo motor 18 and a servo motor 19. Furthermore, a servo motor 21 drives the blow-out port change-over dampers 14 and 15 that are provided in the air conditioning system 7 on the driver's seat side to supply the conditioned air into the air-conditioning zone on the driver's seat side (corresponds to the first air-conditioning zone referred to in the present invention), a servo motor 20 drives the blow-out port change-over dampers 12 and 13 provided in the air-conditioning system 8 on the side of the seat next to the driver to supply the conditioned air into the air-conditioning zone of the side of the seat next to the driver (corresponds to the second air-conditioning zone referred to in the present invention), and a servo motor 22 drives the defroster blow-out port change-over damper 16.

The above-mentioned servo motors 17 to 22 are controlled by an ECU (electronic control unit) 23 that corresponds to the calculation means referred to in the present invention. The ECU 23 controls the blower 3 through a blower controller 24.

Temperature setters 25 and 26 (correspond to first and second temperature-setting means referred to in the present invention) on the driver's seat side and on the seat next to the driver side are used for separately setting a setpoint temperature Tset(Dr) in the air-conditioning zone on the driver's seat side and a setpoint temperature Tset(Pa) in the air-conditioning zone on the side of the seat next to the driver, and the setpoint data are sent to the ECU 23. To the ECU 23 are further sent the outputs from an internal air temperature sensor 27 which is a temperature data-detecting means for detecting the internal air temperature Tr, from an external air temperature sensor 28 which is a temperature data-detecting means for detecting the external air temperature Tam, from a solar radiation amount sensor 29 that detects the amount of solar radiation Ts entering into the passenger compartment of an automobile, from an air temperature sensor 30 that detects the temperature THE of the air after it has exchanged the heat with the evaporator 4, and a cooling water temperature sensor 31 that detects the temperature TW of the engine cooling water.

Though not shown in the diagram, the ECU 23 is supplied with electric power from a battery mounted in the car, when the ignition switch of the car is turned on. When a switch is turned on to start the operation of the air-conditioning unit in an operation state where electric power is being supplied, the ECU 23 starts executing the control program that has been stored therein.

Figure 2:
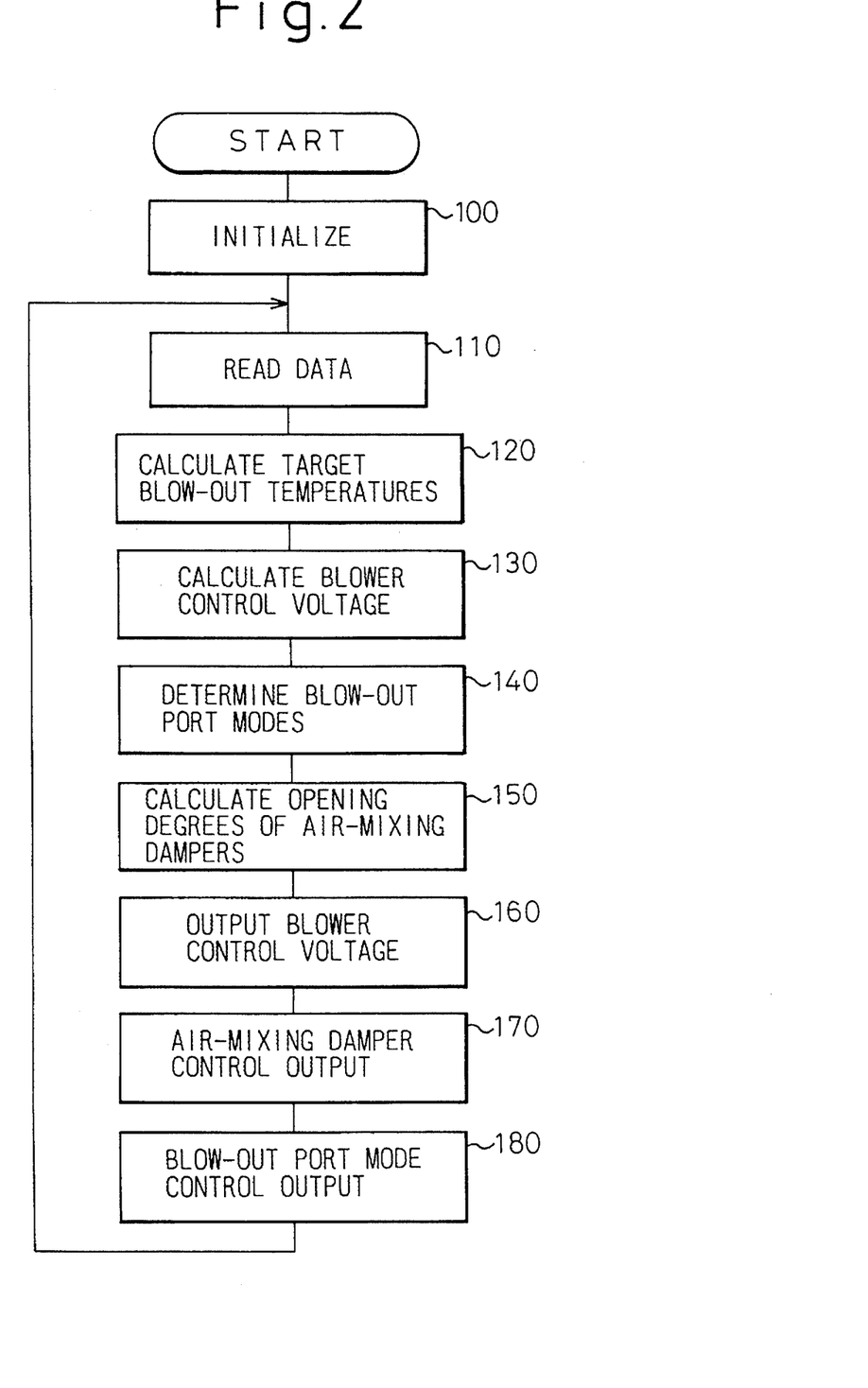
FIG. 2 is a flow chart illustrating the contents of control by the ECU.

Described below with reference to FIG. 2 are the contents of control executed by the ECU 23.

In FIG. 2, when the execution of the control program is started, the contents stored in a data processing memory are first initialized (step 100) and, then, the data such as setpoint temperature Tset(Dr) in the air-conditioning zone on the driver's seat side, setpoint temperature Tset(Pa) in the air-conditioning zone on the side of the seat next to the driver, temperature Tr in the passenger compartment of an automobile, external air temperature Tam, amount of solar radiation Ts, temperature TE of the air, and temperature TW of the engine cooling water are read and are stored in the data processing memory (step 110).

Then, a target blow-out temperature TAO(Dr) on the driver's seat side (corresponds to the first target blow-out temperature referred to in the present invention) and a target blow-out temperature TAO(Pa) on the side of the seat next to the driver (corresponds to the second target blow-out temperature referred to in the present invention) are calculated based upon the above-mentioned stored data and in compliance with the following equations (5) and (6) (step 120).

$$TAO(Dr) = K_{set} \cdot T_{set}(Dr) - Kr \cdot Tr - K_{am} \cdot T_{am} - \\ Ks \cdot Ts + Kd(dr) \{Cd(Dr + Ka(dr) (10 - Tam)\} \\ (T_{set}(Dr) - T_{set}(Pa)) + C \quad (5)$$

$$TAO(Pa) = K_{set} \cdot T_{set}(Pa) - Kr \cdot Tr - K_{am} \cdot T_{am} - \\ Ks \cdot Ts + Kd(Pa) \{Cd(Pa) + Ka(Pa) (10 - Tam)\} \\ (T_{set}(Pa) - T_{set}(Dr)) + C \quad (6)$$

where Tr, Tam and Ts are an internal air temperature, an external air temperature and the amount of solar radiation entering into the passenger compartment of an automobile, Kset, Kr, Kam, Ks, Kd(Dr) and Kd(Pa) denote a temperature setpoint gain, an internal air temperature gain, an external air temperature gain, a solar radiation amount gain, and temperature difference correction gain between the air-conditioning zone on the driver's seat side and the air-conditioning zone on the side of the seat next to the driver, Ka(Dr) and Ka(Pa) are gains for correcting the degrees of the external air temperature Tam that affects the air-conditioning temperatures in the air-conditioning zones of the driver's seat side and of the side of the seat next to the driver, Cd(Dr) and Cd(Pa) are constants that correspond to the above degrees of effect and C denotes a correction constant.

That is, as will become obvious from the comparison of these equations (5) and (6) with the equations (1) and (2) of the conventional constitution, at the time of calculating the target blow-out temperatures TAO(Dr) and TAO(Pa), the ECU 23 adds a correction that varies depending upon the external air temperature Tam which is the temperature data outside the passenger compartment, to a calculation term (calculation term that includes (Tset(Dt)–Tset(Pa) or (Tset(Pa)–Tset(Dr)) that corresponds to a difference between the setpoint temperatures Tset(Dr) and Tset(Pa) in the air-conditioning zones. Here, the correction of the equations (5) and (6) is based on a prerequisite that a relationship between the external air temperature Tam and the control temperature ratio A (ratio of an average temperature difference AT in the air-conditioning zones to a change ΔTset in the setpoint temperatures Tset(Dr) and Tset(Pa)) is as shown in FIG. 8 (control temperature ratio A is "1" when the external air temperature is 10° C.). Therefore, when the relationship between the external air temperature Tam and the control temperature ratio A is different from the one shown in FIG. 8, the correction term (term which includes (10-Tam)) in the equations (5) and (6) must be changed correspondingly.

After the above-mentioned processing is executed at the step 120, a control voltage VA for the blower 3 is calculated based on the target blow-out temperatures TAO(Dr) and TAO(Pa) that are obtained through the calculation at the step 120 (step 130). The above control voltage VA is obtained by finding control voltages VA(Dr) and VA(Pa) suited for the target blow-out temperatures TAO(Dr) and TAO(Pa) based upon a relationship of FIG. 5 and by averaging these control voltages VA(Dr) and VA(Pa).

At a step 140 are determined blow-out port modes in the air-conditioning system 7 on the driver's seat side and in the air-conditioning system 8 on the side of the seat next to the driver based upon the target blow-out temperatures TAO(Dr) and TAO(Pa) on the driver's seat side and on the seat next to the driver side calculated at the step 120 and further based upon the target blow-out temperature vs. blow-out port mode characteristics shown in FIG. 4.

Then, at a step 150 are calculated an opening degree SW(Dr)(%) of the air-mixing damper 9 on the driver's seat side and an opening degree SW(Pa)(%) of the air-mixing damper 10 on the side of the seat next to the driver. The opening degrees SW(Dr) and SW(Pa) are calculated based upon the target blow-out temperatures TAO(Dr) and TAO(Pa), the temperature TW of the engine cooling water and the air temperature TE that are read at the step 110 in compliance with the aforementioned equations (3) and (4).

A step 160 outputs a control voltage VA for the blower 3 calculated at the step 130 through the blower controller 24. A step 170 so controls the servo motors 18 and 19 that the opening degrees of the air-mixing damper 9 on the driver's seat side and of the air-mixing damper 10 on the side of the seat next to the driver become equal to the opening degrees SW(Dr) and SW(Pa) that are determined at the step 150. Then, a step 180 so controls the servo motors 20 and 21 that the blow-out port modes in the air-conditioning system 7 on the driver's seat side and in the air-conditioning system 8 on the side of the seat next to the driver become equal to the blow-out port modes determined at the step 140.

In short, according to the above-mentioned constitution of the present invention, the target blow-out temperatures TAO(Dr) and TAO(Pa) in the air-conditioning zone on the driver's seat side and in the air-conditioning zone on the side of the seat next to the driver are calculated based upon the temperatures Tset(Dr) and Tset(Pa) set by the temperature setters 25 and 26, a difference between the setpoint temperatures Tset(Dr) and Tset(Pa), an internal air temperature Tr and an external air temperature Tam detected by the internal air temperature sensor 27 and the external air temperature sensor 28, and the temperatures of the conditioned air blown into the air-conditioning zones are separately controlled so that the target blow-out temperatures TAO(Dr) and TAO(Pa) are obtained. Thus, the temperatures in the air-conditioning zones are independently controlled.

According to this embodiment, in particular, the following effects are obtained since a correction that varies depending upon the external temperature Tam is added to a calculation term that corresponds to a difference between the setpoint temperatures Tset(Dr) and Tset(Pa) in the air-conditioning zones at the time of calculating the target blow-out temperatures TAO(Dr) and TAO(Pa).

That is, when a setpoint temperature Tset(Dr) in the air-conditioning zone on the driver's seat side is different from a setpoint temperature Tset(Pa) in the air-conditioning zone on the side of the seat next to the driver according to the prior art, the practical difference in the air-conditioning temperatures between the air-conditioning zones becomes smaller than the preset difference in a state where the external air temperature Tam is relatively high and, on the contrary, the practical difference in the air-conditioning temperatures between the air-conditioning zones becomes larger than the preset difference in a state where the external air temperature Tam is relatively low. According to the above-mentioned embodiment which has effected the correction, on the other hand, it is made possible to prevent the practical difference in the air-conditioning temperatures between the air-conditioning zones from deviating beyond a preset value despite the external air temperature changes and, as a result, the air-conditioning zones are controlled highly independently from each other.

In the above-mentioned embodiment, calculation terms corresponding to the difference between the setpoint temperatures Tset(Dr) and Tset(Pa) in the air-conditioning zones were corrected by the external air temperature Tam at the time of calculating the target blow-out temperatures TAO(Dr) and TAO(Pa) in compliance with the equations (5) and (6). The same effects, however, can also be obtained even when the calculation terms in the equations (5) and (6) are corrected depending upon the target blow-out temperatures TAO(Dr) and TAO(Pa).

The blow-out port modes are determined by the target blow-out temperatures TAO(Dr) and TAO(Pa). When the practical air stream in the passenger compartment of an automobile is taken into consideration, furthermore, it is quite probable that the blow-out temperatures into the air-conditioning zone on the driver's seat side and into the air-conditioning zone on the side of the seat next to the driver as well as the air stream interference conditions by the passengers, are different depending upon the blow-out port mode. The effects of the invention can be obtained to a considerable degree even when the calculation terms corresponding to the difference between the setpoint temperatures Tset(Dr) and Tset(Pa) in the equations (5) and (6) are corrected depending upon the blow-out port mode. In particular, the constitution in which the correction is effected depending upon the blow-out port mode can be adapted even to a constitution where the pairs of dampers 12, 13 and 14, 15 for changing over the blow-out port mode are replaced by single dampers.

The above-mentioned embodiment has dealt with the case where the air-conditioning zone on the driver's seat side and the air-conditioning zone on the side of the seat next to the driver were independently set as the first air-conditioning zone and the second air-conditioning zone. It is, however, also allowable that the front seat in the passenger compartment of an automobile is set as the first air-conditioning zone and the rear seat is set as the second air-conditioning zone. It is further allowable that the region on the upper side in the passenger compartment of an automobile is set as the first air-conditioning zone and the region on the lower side is set as the second air-conditioning zone.

An air-conditioning device of another embodiment in the present invention, will be explained hereunder with reference to FIGS. 9 to 12.

In accordance with the second embodiment, the air-conditioning device controls the air-condition inside the passenger's compartment by adjusting the air-condition in accordance with the blow-out modes for the driver's seat side and for the seat next to the driver.

First, the contents of the control executed by ECU 23 will be explained with reference to FIG. 9.

Figure 9:
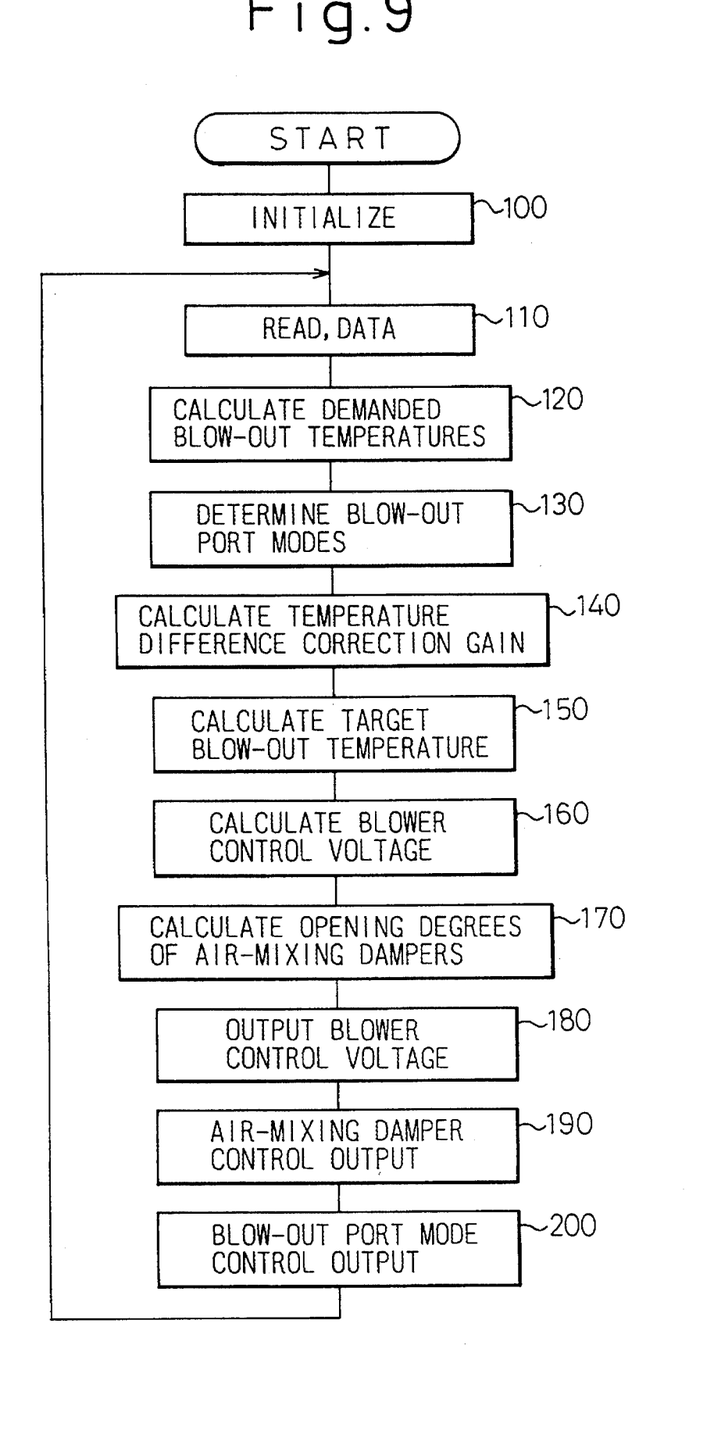
FIG. 9 is a flaw chart illustrating the contents of control by the ECU of another embodiment of the present invention.

In FIG. 9, when the execution of the control program is started, the contents stored in a data processing memory are first initialized (step 100) and, then, the data such as setpoint temperature Tset(Dr) in the air-conditioning zone on the side of the drivers seat, setpoint temperature Tset(Pa) in the air-conditioning zone on the side of the seat next to the driver, temperature Tr in the passenger compartment of an automobile, external air temperature Tam, amount of solar radiation Ts, temperature TE of the air, and temperature TW of the engine cooling water are read and are stored in the data processing memory (step 110).

Then, a demanded blow-out temperature TAOD(Dr) on the driver's seat side and a demanded blow-out temperature TAOD(Pa) on the side of seat next to the driver are calculated based upon the above-mentioned stored data and in compliance with the following equations (7) and (8) (step 120).

$$TAOD(Dr) = K_{set} \cdot T_{set}(Dr) - Kr \cdot Tr - K_{am} \cdot T_{am} - Ks \cdot Ts + C \quad (7)$$

$$TAOD(Pa) = K_{set} \cdot T_{set}(Pa) - Kr \cdot Tr - K_{am} \cdot T_{am} - Ks \cdot Ts + C \quad (8)$$

where Tr, Tam and Ts are an internal air temperature, an external air temperature and the amount of solar radiation entering into the passenger compartment of an automobile, Kset, Kr, Kam, Ks, denote a temperature setpoint gain, an internal air temperature gain, an external air temperature gain, a solar radiation amount gain, and C denotes a correction constant.

At a step 130 are determined blow-out port modes in the air-conditioning system 7 on the driver's seat side and in the air-conditioning system 8 on the side of the seat next to the driver based upon the demanded blow-out temperatures TAOD(Dr) and TAOD(Pa) on the driver's seat side and on the side of seat next to the driver calculated at the step 120 and further based upon the target blow-out temperature vs. blow-out port mode characteristics shown in FIG. 4.

Figure 12:
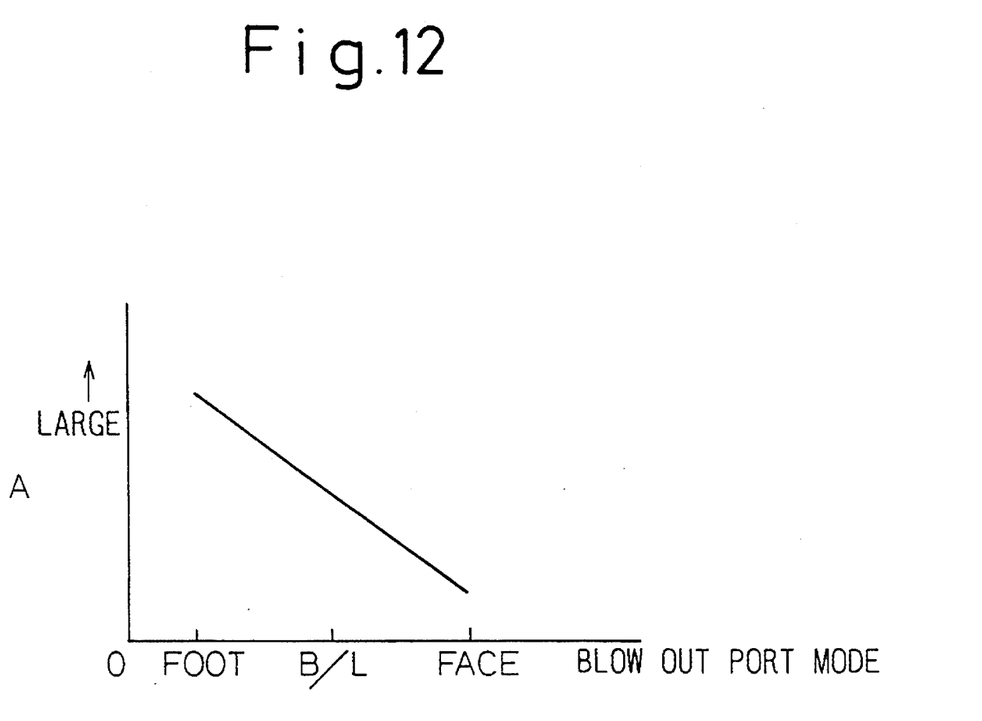
FIG. 12 is a graph showing a relationship between the blow-out port modes and to control temperature ratio A.

Next, at step 140, at the time of calculating the target blow-out temperatures TAO(Dr) and TAO(Pa), the ECU 23 adds a correction that varies depending upon the blow-out port modes, to a calculation term (calculation term that includes (Tset(Dt)–Tset(Pa) or (Tset(Pa)–Tset(Dr)) that corresponds to a difference between the setpoint temperatures Tset(Dr) and Tset(Pa) in each of the air-conditioning zones. Here, in the equations (9) and (10) the correction is based on a prerequisite that a relationship between the blow-out port modes and the control temperature ratio A (ratio of an average temperature difference $\Delta T$ in the air-conditioning zones to a change $\Delta Tset$ in the setpoint temperatures Tset(Dr) and Tset(Pa)) is as shown in FIG. 12 (control temperature ratio A is "1" when the external air temperature is 10° C.).

At step 150, a target blow-out temperature TAO(Dr) on the driver's seat side (corresponds to the first target blow-out temperature referred to in the present invention) and a target blow-out temperature TAO(Pa) on the side of the seat next to the driver (corresponds to the second target blow-out temperature referred to in the present invention) are calculated based upon the above-mentioned stored data and in compliance with the following equations (9) and (10).

$$TAO(Dr) = TAOD(Dr) + Kd(Dr) \{Cd(Dr) + Ka(Dr) (10 - Tam)\} (T_{set}(Dr) - T_{set}(Pa)) + C \quad (9)$$

$$TAO(Pa) = TAOD(Pa) + Kd(Pa) \{Cd(Pa) + Ka(Pa) (10 - Tam)\} (T_{set}(Pa) - T_{set}(Dr)) + C \quad (10)$$

where Kd(Dr) and Kd(Pa) denote a temperature difference correction gain between the air-conditioning zone on the the driver's seat side and the air-conditioning zone on the side of the seat next to driver. Ka(Dr) and Ka(Pa) are gains for correcting the degrees of the external air temperature Tam that affects the air-conditioning temperatures in the air-conditioning zones of the driver's seat side and of the side of the seat next to the driver. Cd(Dr) and Cd(Pa) are constants that correspond to the above degrees of effect.

At step 160, a control voltage VA for the blower 3 is calculated based on the target blow-out temperatures TAO(Dr) and TAO(Pa) that are obtained through the calculation at the step 150. The above control voltage VA is obtained by finding control Voltage VA(Dr) and VA(Pa) suited for the target blow-out temperatures TAO(Dr) and TAO(Pa) based upon a relationship of FIG. 5 and by averaging these control voltages VA(Dr) and VA(Pa).

Then, at a step 170 are calculated an opening degree SW(Dr)(%) of the air-mixing damper 9 on the driver's seat side and an opening degree SW(Pa)(%) of the air-mixing damper 10 on the side of the seat next to the driver. The opening degrees SW(Dr) and SW(Pa) are calculated based upon the target blow-out temperatures TAO(Dr) and TAO(Pa), the temperature TW of the engine cooling water and the air temperature TE that are read at the step 110 in compliance with the aforementioned equations (3) and (4).

A step 180 outputs a control voltage VA for the blower 3 calculated at the step 160 through the blower controller 24. A step 190 so controls the servo motors 18 and 19 that the opening degrees of the air-mixing damper 9 on the driver's seat side and of the air-mixing damper 10 on the side of the seat next to driver become equal to the opening degrees SW(Dr) and SW(Pa) that are determined at the step 170. Then, a step 200 so controls the servo motors 20 and 21 that the blow-out port modes in the air-conditioning system 7 on the driver's seat side side and in the air-conditioning system 8 on the side of the seat next to the driver become equal to the blow-out port modes determined at the step 140.

Figure 10:
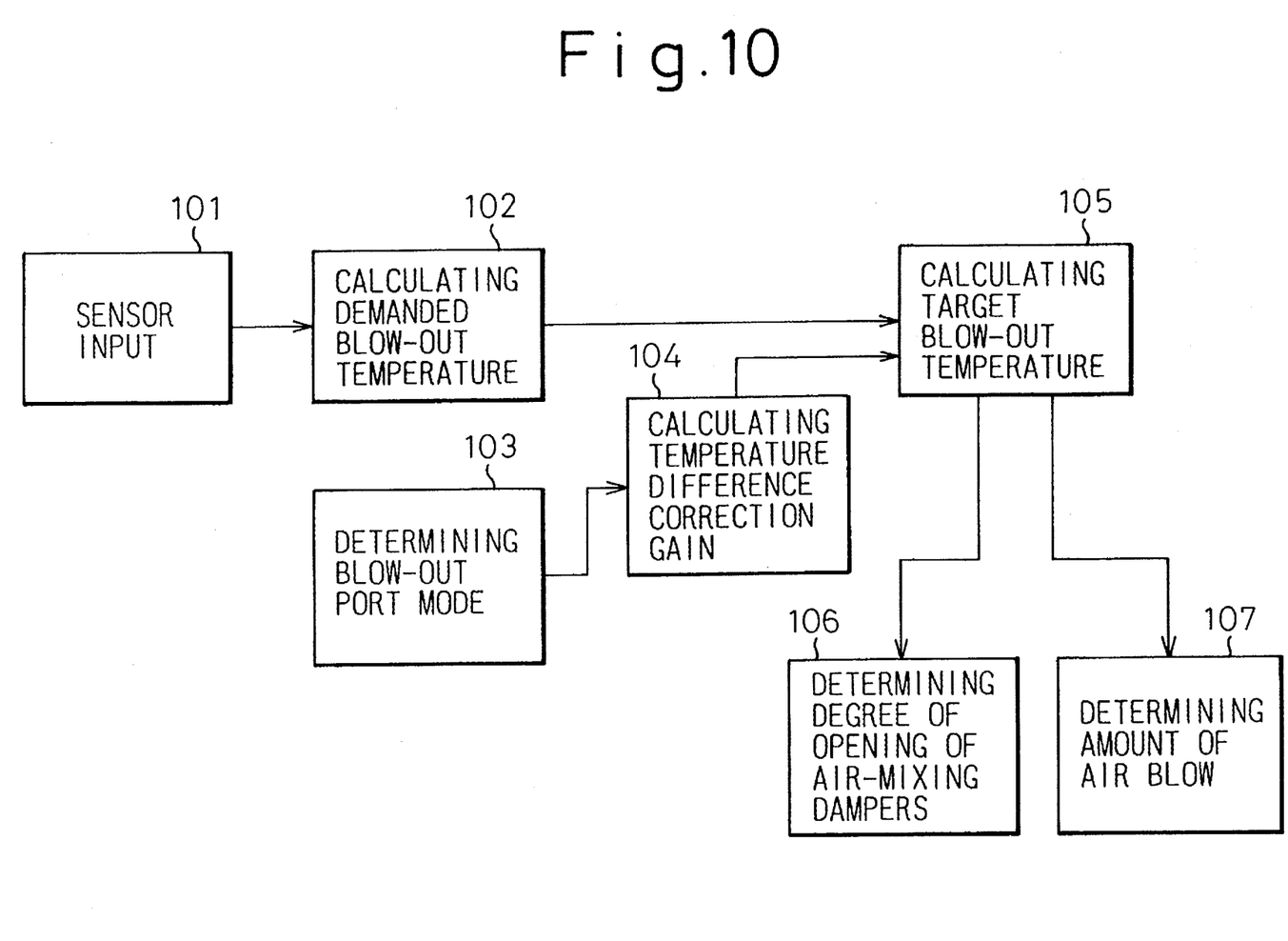
FIG. 10 is a block-diagram illustrating an operation of a control system of another embodiment of the present invention.

FIG. 10 is a block-diagram illustrating an outline of the operation of a control system in another embodiment of the present invention.

Note, that a plurality of sensing data, such as shown in FIG. 1 are input into ECU 23 through the respective sensors at an operation 101 and utilizing these data, the demanded blow-out temperature TAOD(Dr) on the driver's seat side and the demanded blow-out temperature TAOD(Pa) on the side of the seat next to the driver, are calculated at an operation 102.

Then, depending upon the demanded blow-out temperatures TAOD(Dr) and TAOD(Pa), the blow-out port mode in the above-mentioned both sides are determined at an operation 103 and the temperature difference correction gain is calculated at an operation 104, utilizing the output blow-out port mode data.

Further, in the next operation, at an operation 105, the target blow-out temperature TAO(Dr) on the driver's seat side and the target blow-out temperature TAO(Pa) on the side of the seat next to the driver, are calculated utilizing the demanded blow-out temperatures TAOD(Dr) and TAOD(Pa) and the blow-out port modes.

Depending upon the output of target blow-out temperatures TAO(Dr) and TAO(Pa), the opening degree of the air-mixing dampers is calculated in an operation 106 and an amount of air blow is also calculated in an operation 107, respectively.

Figure 11:
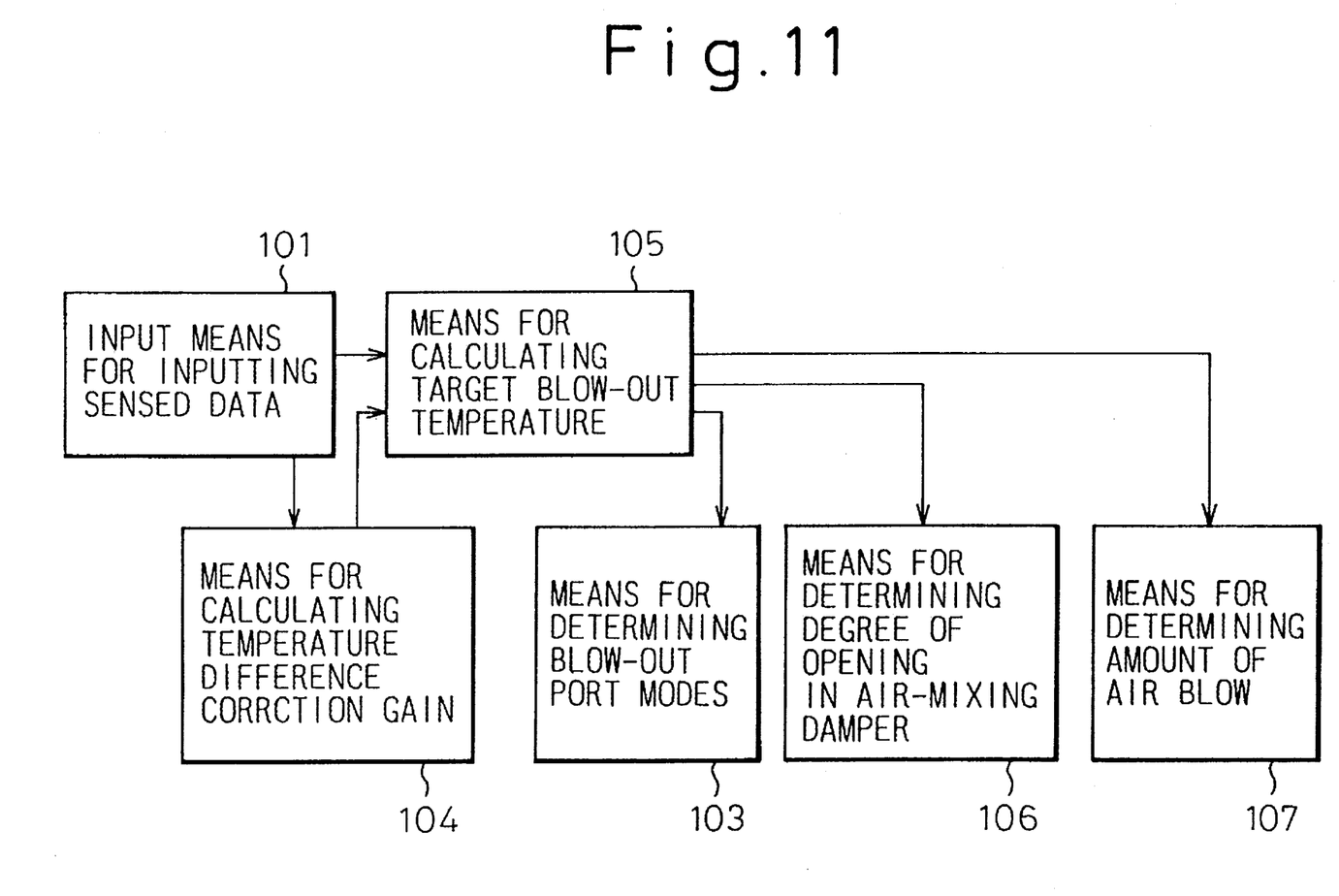
FIG. 11 is a block-diagram illustrating a basic structure of an air conditioning device of another embodiment in the present invention.

FIG. 11 is a block-diagram illustrating a basic structure of an air conditioning device of another embodiment in the present invention.

As shown in FIG. 11, another embodiment of the air-conditioning device of the present invention basically comprises a sensor input means 101 to which a plurality of sensing data, such as shown in FIG. 1 are input into ECU 23, through the respective sensors, a temperature difference correction gain calculating means 104, connected to the sensor input means 101, a target blowout temperatures TAO(Dr) and TAO(Pa) processing means 105, connected to the outputs of the sensor input means 101 and temperature difference correction gain calculating means 104, a blow-out port mode determing means 103, a calculating means for calculating an opening degree of the air-mixing dampers 106 and a calculating means for calculating an amount of air blow 107, each of three of which is connected to an output of the target blow-out temperatures TAO(Dr) and TAO(Pa) processing means 105, respectively.

Moreover, the present invention is not limited to the above embodiment only but can be modified in a variety of other ways without departing from the gist and scope of the invention, such as being adapted as an air-conditioning device for general dwellings.

According to the present invention as will be obvious from the foregoing description, the temperatures in the first air-conditioning zone and in the second air-conditioning zones are separately controlled relying upon the first and second target blow-out temperatures calculated based upon the temperatures set for the air-conditioning zones, a difference between the setpoint temperatures and temperature data inside and outside the passenger compartment. Besides, a correction that varies depending upon the temperature data outside the passenger compartment is added to the calculation term that corresponds to a difference between the setpoint temperatures in the air-conditioning zones. Therefore, the air-conditioning zones can be controlled highly independently irrespective of the difference between the setpoint temperatures in the air-conditioning zones or the external air temperature conditions.

We claim:

1. An air-conditioning device in which a first air-conditioning zone and a second air-conditioning zone are set in a room, and the temperatures in these air-conditioning zones are separately adjusted by the conditioned air blown from the blow-out ports provided for these air-conditioning zones, comprising:

first and second temperature-setting means for separately setting the temperatures in said first and second air-conditioning zones;

a temperature data-detecting means for detecting the temperature inside the room and the temperature outside the room;

a calculation means for calculating first and second target blow-out temperatures for said air-conditioning zones based upon the setpoint temperatures set by said first and second temperature-setting means for said first and second air-conditioning zones, an amount of solar radiation, and temperature data detected by said temperature data-detecting means; and a temperature-adjusting means for so adjusting the temperatures of the conditioned air from the blow-out ports corresponding to said first and second air-conditioning zones that the first and second target blow-out temperatures calculated by said calculation means are realized;

wherein said calculation means adds a correction which varies depending upon the temperature data outside the room detected by said temperature data-detecting means to a calculation term that utilizes the difference between the setpoint temperatures in said first and second air-conditioning zones at the time of calculating said first and second target blow-out temperatures.

2. An air-conditioning device in which a first air-conditioning zone and a second air-conditioning zone are set in a room, and the temperatures in these air-conditioning zones are separately adjusted by the conditioned air blown from the blow-out ports provided for these air-conditioning zones, comprising:

first and second temperature-setting means for separately setting the temperatures in said first and second air-conditioning zones;

a temperature data-detecting means for detecting the temperature inside the room and the temperature outside the room;

a calculation means for calculating first and second target blow-out temperatures for said air-conditioning zones based upon the setpoint temperatures set by said first and second temperature-setting means for said first and second air-conditioning zones, an amount of solar radiation and temperature data detected by said temperature data-detecting means; and a temperature-adjusting means for so adjusting the temperatures of the conditioned air from the blow-out ports corresponding to said first and second air-conditioning zones that the first and second target blow-out temperatures calculated by said calculation means are realized;

wherein said calculation means adds a correction which varies depending upon said first and second target blow-out temperatures in said respective zones to a calculation term that utilizes the difference between the setpoint temperatures in said first and second air-conditioning zones at the time of calculating said first and second target blow-out temperatures.

3. An air-conditioning device in which a first air-conditioning zone and a second air-conditioning zone are set in a room, and the temperatures in these air-conditioning zones are separately adjusted by the conditioned air blown from the blow-out ports provided for these air-conditioning zones, comprising:

first and second temperature-setting means for separately setting the temperatures in said first and second air-conditioning zones;

a temperature data-detecting means for detecting the temperature inside the room and the temperature outside the room;

a calculation means for calculating first and second target blow-out temperatures for said air-conditioning zones based upon the setpoint temperatures set by said first and second temperature-setting means for said first and second air-conditioning zones, an amount of solar radiation, and temperature data detected by said temperature data-detecting means; and a temperature-adjusting means for so adjusting the temperatures of the conditioned air from the blow-out ports corresponding to said first and second air-conditioning zones that the first and second target blow-out temperatures calculated by said calculation means are realized;

wherein said calculation means adds a correction which varies depending upon the blow-out port mode in each of the zones to a calculation term that utilizes the difference between the setpoint temperatures in said first and second air-conditioning zones at the time of calculating said first and second target blow-out temperatures.

4. An air-conditioning device according to either claim 1, 2 or 3, wherein said first air-conditioning zone and second air-conditioning zone are a pair of regions selected from two regions obtained by dividing the interior of the room of an automobile into right and left sections, two regions obtained by dividing the interior of the room of an automobile into the front an the rear, and two regions obtained by dividing the interior of the room of an automobile into the upper half and the lower half.

5. An air-conditioning device in which a first air-conditioning zone and a second air-conditioning zone are set in a room, and the temperatures in these air-conditioning zones are separately adjusted by the conditioned air blown from the blow-out ports provided for these air-conditioning zones, comprising:

first and second temperature-setting means for separately setting the temperatures in said first and second air-conditioning zones;

a temperature data-detecting means for detecting the temperature inside the room and the temperature outside the room;

a calculation means for calculating first and second demanded blow-out temperatures for said air-conditioning zones based upon the setpoint temperatures set by said first and second temperature-setting means for said first and second air-conditioning zones, an amount of solar radiation and temperature data detected by said temperature data-detecting means;

a means for determining a blow-out port mode utilizing said first demanded blow-out temperature and said second demanded blow-out temperature and a target blow-out temperature vs. blow-out port mode characteristics;

a means for generating a temperature difference correction gain depending upon a blow-out port mode and the temperature difference formed between said first and second air-conditioning zones;

a calculating means for calculating a first and second target blow-out temperatures for said air-conditioning zones based upon said first demanded blow-out temperature and said second demanded blow-out temperature, said set-point temperatures set by said first and second temperature-setting means for said first and second air-conditioning zones and said temperature difference correction gain;

a temperature-adjusting means for so adjusting the temperatures of the conditioned air from the blow-out ports corresponding to said first and second air-conditioning zones that the first and second target blow-out temperatures calculated by said calculation means are realized;

wherein said calculation means adds a correction which varies depending upon the temperature data outside the room detected by said temperature data-detecting means to a calculation term that utilizes the difference between the setpoint temperatures in said first and second air-conditioning zones at the time of calculating said first and second target blow-out temperatures.

\* \* \* \* \*